United States Patent
Kim

(10) Patent No.: US 10,013,139 B2
(45) Date of Patent: Jul. 3, 2018

(54) APPARATUS AND METHOD FOR CONTROLLING DISPLAY OF CLUSTER FOR VEHICLE

(71) Applicant: Hyundai Motor Company, Seoul (KR)

(72) Inventor: Ju Hyuk Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 6 days.

(21) Appl. No.: 15/217,740

(22) Filed: Jul. 22, 2016

(65) Prior Publication Data

US 2017/0308265 A1    Oct. 26, 2017

(30) Foreign Application Priority Data

Apr. 25, 2016    (KR) .................. 10-2016-0050167

(51) Int. Cl.
| | |
|---|---|
| *G06F 15/00* | (2006.01) |
| *G06F 13/00* | (2006.01) |
| *G06F 3/0481* | (2013.01) |
| *B60K 35/00* | (2006.01) |

(52) U.S. Cl.
CPC .......... *G06F 3/04815* (2013.01); *B60K 35/00* (2013.01); *G06F 3/04817* (2013.01); *B60K 2350/1096* (2013.01); *B60K 2350/352* (2013.01)

(58) Field of Classification Search
CPC ............................ H04N 13/0425; G06F 3/017
USPC .......................... 715/769, 770, 780, 763–765
See application file for complete search history.

(56) References Cited

U.S. PATENT DOCUMENTS

| | | | |
|---|---|---|---|
| 2014/0104682 A1 | 4/2014 | Nagahara | |
| 2014/0282161 A1* | 9/2014 | Cash ....................... | G06F 3/017 |
| | | | 715/769 |
| 2015/0109756 A1 | 4/2015 | Choi | |
| 2015/0178985 A1 | 6/2015 | Di Censo et al. | |
| 2015/0245017 A1* | 8/2015 | Di Censo .......... | H04N 13/0425 |
| | | | 348/51 |

FOREIGN PATENT DOCUMENTS

| | | |
|---|---|---|
| JP | 4968017 B2 | 7/2012 |
| JP | 2014-081483 A | 5/2014 |
| JP | 2015-063148 A | 4/2015 |
| JP | 2015-130666 A | 7/2015 |
| KR | 10-1088846 B1 | 12/2011 |
| KR | 10-2012-0072867 A | 7/2012 |
| KR | 10-2013-0120282 A | 11/2013 |
| KR | 2014-0008216 A | 1/2014 |
| KR | 10-1491330 B1 | 2/2015 |

* cited by examiner

*Primary Examiner* — Kevin Nguyen
(74) *Attorney, Agent, or Firm* — Mintz Levin Cohn Ferris Glovsky and Popeo, P.C.; Peter F. Corless

(57) ABSTRACT

An apparatus for controlling a display of a cluster for a vehicle includes: a setting unit receiving settings indicating three-dimensional (3D) levels with respect to various information from an operator; a communication unit collecting information to be displayed on the cluster; a control unit controlling the cluster to apply 3D levels corresponding to the information collected by the communication unit and to display the collected information with the corresponding 3D levels applied thereto; and the cluster displaying the collected information with the corresponding 3D levels applied thereto.

20 Claims, 5 Drawing Sheets

APPARATUS AND METHOD FOR CONTROLLING DISPLAY OF CLUSTER FOR VEHICLE

CROSS-REFERENCE TO RELATED APPLICATION

This application claims the benefit of and priority to Korean Patent Application No. 10-2016-0050167, filed on Apr. 25, 2016 in the Korean Intellectual Property Office, the disclosure of which is incorporated herein in its entirety by reference.

TECHNICAL FIELD

The present disclosure relates generally to an apparatus and a method for controlling a display of a cluster for a vehicle and, more particularly, to a technology for increasing recognition and intuition of an operator by giving a three-dimensional (3D) effect to various information displayed on a cluster of a vehicle.

BACKGROUND

In general, a cluster is provided in front of a driver's seat in a vehicle to display vehicle driving information, information related to operating states of various devices and machines (such as an engine), warning messages, or the like, using characters or figures. The cluster may be provided with a plurality of gauges and indicators. For example, the cluster may be provided with a speedometer for displaying the instantaneous speed of a vehicle, a trip odometer, an integrator, a revolutions per minute (RPM) meter for displaying revolutions of the engine per minute, a fuel gauge for displaying the amount of fuel remaining, a temperature indicator for displaying the temperature of a coolant, as well as a brake warning light, a seat-belt warning light, an anti-lock braking system (ABS) warning light, and various gauges and indicators for displaying the operating states, warning states, and the like of in-vehicle subsystems.

Recent clusters may include a liquid crystal display (LCD) such as a double-layer super twisted nematic (DSTN)-type LCD or a thin film transistor (TFT)-type LCD in order to display various information in the form of graphics, icons, words, numbers, and the like. A conventional apparatus for controlling a display of a cluster displays various icons in three colors, i.e., red, amber, and green, depending on the degree of importance, displays a set speed of a smart cruise control (SCC) system as a solid line on a speedometer, and displays a speed limit of a road acquired by interlocking with a navigation system as two-dimensional (2D) digital numbers. However, since the conventional apparatus for controlling a display of a cluster is limited to displaying information in a 2D manner, the recognition and intuition of a vehicle operator may also be limited.

SUMMARY

The present disclosure has been made to solve the above-mentioned problems occurring in the related art while advantages achieved by the related art are maintained intact.

An aspect of the present disclosure provides an apparatus and a method for controlling a display of a cluster for a vehicle, which give a three-dimensional (3D) effect to various information displayed on the cluster of the vehicle, thereby increasing recognition and intuition of a vehicle operator.

The object of the present disclosure is not limited to the foregoing object, and any other objects and advantages not mentioned herein will be clearly understood from the following description. The present inventive concept will be more clearly understood from embodiments of the present disclosure. In addition, it will be apparent that the objects and advantages of the present disclosure can be achieved by the elements claimed in the claims and a combination thereof.

According to embodiments of the present disclosure, an apparatus for controlling a display of a cluster for a vehicle includes: a setting unit receiving settings indicating three-dimensional (3D) levels with respect to various information from an operator; a communication unit collecting information to be displayed on the cluster; a control unit controlling the cluster to apply 3D levels corresponding to the information collected by the communication unit and to display the collected information with the corresponding 3D levels applied thereto; and the cluster displaying the collected information with the corresponding 3D levels applied thereto.

Furthermore, according to embodiments of the present disclosure, a method for controlling a display of a cluster for a vehicle includes: receiving, at a setting unit, settings indicating three-dimensional (3D) levels with respect to various information from an operator; collecting, by a communication unit, information to be displayed on the cluster; controlling, by a control unit, the cluster to apply 3D levels corresponding to the information collected by the communication unit and to display the collected information with the corresponding 3D levels applied thereto; and displaying, by the cluster, the collected information with the corresponding 3D levels applied thereto.

BRIEF DESCRIPTION OF THE DRAWINGS

The above and other objects, features and advantages of the present disclosure will be more apparent from the following detailed description taken in conjunction with the accompanying drawings.

Figure 1:
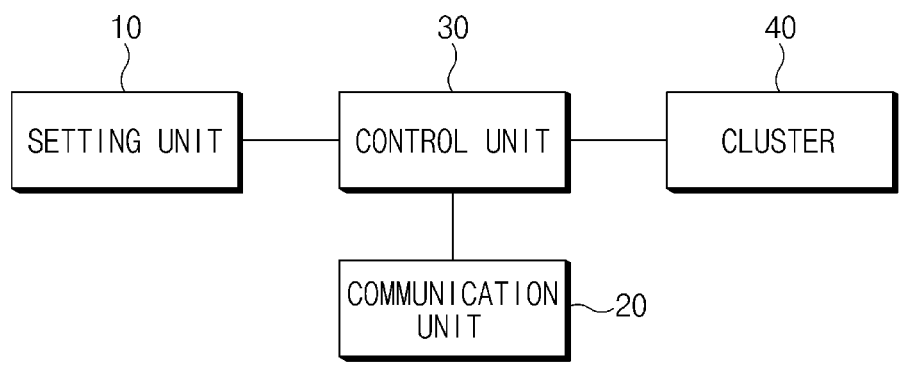
FIG. 1 illustrates the configuration of an apparatus for controlling a display of a cluster for a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The above and other objects, features and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the gist of the present disclosure. Hereinafter, exemplary embodiments of the present disclosure will be described in detail with reference to the accompanying drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 illustrates the configuration of an apparatus for controlling a display of a cluster for a vehicle, according to embodiments of the present disclosure.

As illustrated in FIG. 1, the apparatus for controlling a display of a cluster for a vehicle, according to the embodiments of the present disclosure, includes a setting unit 10, a communication unit 20, a control unit 30, and a cluster 40.

With respect to each of the aforementioned elements, first, the setting unit 10 may receive settings indicating three-dimensional (3D) levels (for example, first to ninth levels), from a vehicle operator, with respect to various information to be displayed on the cluster 40. Here, when the 3D levels are set with respect to various information (warning lights, speed limits, and the like) to be displayed on the cluster 40 based on particular default values that are preloaded in the vehicle at the factory, the operator may freely adjust the 3D levels to change corresponding default values. A difference between the 3D levels may be diversely set to 0.5 cm, 1 cm, 2 cm, or the like.

For example, a first 3D level may be set to an icon (hereinafter referred to as the "first icon") for a warning displayed as green color; a second 3D level may be set to an icon (hereinafter referred to as the "second icon") for a warning displayed as amber color; and a third 3D level may be set to an icon (hereinafter referred to as the "third icon") for a warning displayed as red color. Here, since the degrees of importance of respective icons are "the first icon<the second icon<the third icon", the 3D levels may be set in order of importance; however, the setting of levels is not limited thereto.

In addition, the first icon may include, for example, a headlight, a front fog light, a turn signal light, and an ECO-mode; the second icon may include, for example, warning lights, a rear fog light, and an Electronic Stability Control (ESC) ON/OFF; and the third icon may include, for example, a coolant temperature and collision warnings. Here, collision warnings refer to warnings generated by various comfort systems provided in a vehicle such as a side obstacle warning system (SOWS), a collision avoidance system, a blind spot detection (BSD) system, and a parking assist system (PAS).

In a parking assist system (PAS), for example, a low 3D level may be set with respect to a first warning icon (the first icon) having a low degree of risk; an intermediate 3D level may be set with respect to a second warning icon (the second icon) having an intermediate degree of risk; and a high 3D level may be set with respect to a third warning icon (the third icon) having a high degree of risk. However, the setting of levels is not limited thereto.

In addition, the setting unit may receive settings indicating 3D levels from the operator with respect to a set speed of a smart cruise control (SCC) system and/or a speed limit of a road acquired by a navigation system.

The communication unit 20 is a module that provides an interface with an in-vehicle network system. The communication unit 20 may collect information to be displayed on the cluster under control of the control unit 30. Here, the communication unit 20 may also directly receive information to be displayed on the cluster without communications with the in-vehicle network system. The in-vehicle network system can include, for example, a Controller Area Network (CAN), a Local Interconnect Network (LIN), FlexRay, a Media Oriented System Transport (MOST), or the like.

For reference, exemplary information to be displayed on the cluster 40 is listed below (though the displayable information is not limited thereto). The above-stated 3D levels may be set to information displayed as any color, such as, for example, one of green, amber, and red colors. As another example, 3D levels may also be set to information displayed as white, blue, and yellow colors.

1. Front Fog Light
2. Power Steering Warning Light
3. Rear Fog Light
4. Washer Fluid Low
5. Brake Pad Warning
6. Cruise Control On
7. Direction Indicators
8. Rain and Light Sensor
9. Winter Mode
10. Information Indicator
11. Glow Plug/Diesel Pre-heat Warning
12. Frost Warning
13. Ignition Switch Warning
14. Key Not In Vehicle
15. Key Fob Battery Low
16. Distance Warning
17. Press Clutch Pedal
18. Press Brake Pedal
19. Steering Lock Warning
20. Main Beam Headlights
21. Tire Pressure Low
22. Sidelight Information
23. Exterior Light Fault
24. Brake Lights Warning
25. Diesel Particulate Filter Warning
26. Trailer Tow Hitch Warning
27. Air Suspension Warning
28. Lane Departure Warning
29. Catalytic Converter Warning
30. Seat Belt Not On
31. Parking Brake Light
32. Battery/Alternator Warning
33. Parking Assist
34. Service Required
35. Adaptive Lighting
36. Headlight Range Control
37. Rear Spoiler Warning
38. Convertible Roof Warning
39. Airbag Warning
40. Hand Brake Warning
41. Water In Fuel Filter
42. Airbag Deactivated
43. Fault Problem
44. Dipped Beam Headlights
45. Dirty Air Filter
46. ECO Driving Indicator
47. Hill Descent Control
48. Temperature Warning
49. Anti-lock Brake System (ABS) Warning
50. Fuel Filter Warning
51. Door Open
52. Bonnet Open
53. Low Fuel
54. Automatic Gearbox Warning
55. Speed Limiter
56. Suspension Dampers
57. Oil Pressure Low
58. Windscreen Defrost
59. Boot Open
60. Stability Control Off
61. Rain Sensor
62. Engine/Emissions Warning
63. Rear Window Defrost
64. Auto Window Screen Wiping The control unit 30 generally controls the aforementioned respective elements to perform the functions thereof normally. In particular, the control unit 30 may receive the 3D levels with respect to various information, which are set by the operator, through the setting unit 10. That is, the control unit 30 may provide the operator with a user interface as illustrated in FIG. 5 through the cluster 40, so as to receive the 3D levels with respect to various information from the operator.

Figure 5:
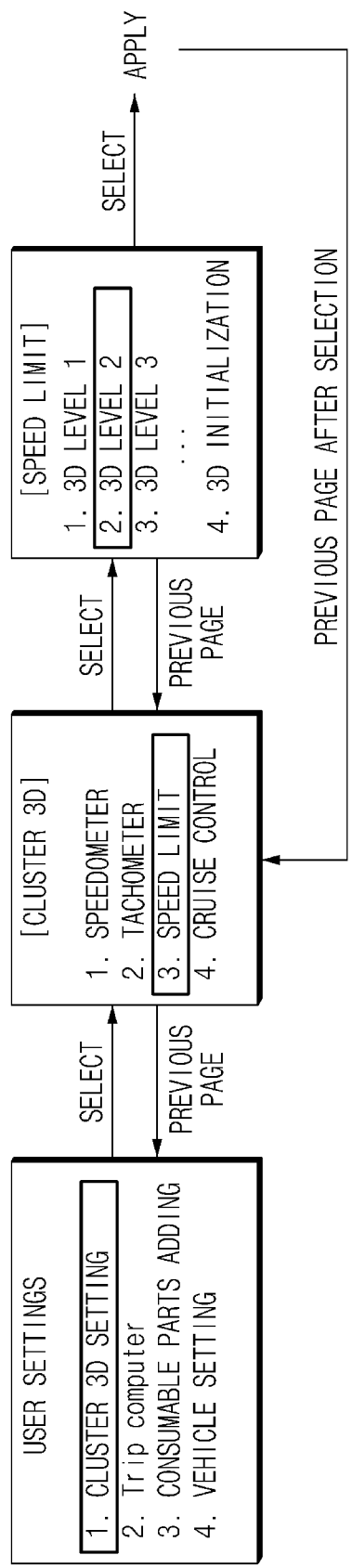
FIG. 5 illustrates a user interface, according to embodiments of the present disclosure.

As illustrated in FIG. 5, when a "cluster 3D setting" item is selected from a user settings menu, a cluster 3D menu appears as a lower menu. Here, the cluster 3D menu includes "speedometer", "tachometer", "speed limit", "cruise control", and the like.

When "speed limit" is selected from the cluster 3D menu, 3D Level items (3D Level 1, 3D Level 2, 3D Level 3, . . . , 3D Initialization) with respect to the speed limit may appear. Therefore, the operator may select the 3D levels with respect to the speed limit through the setting unit 10. Here, "3D Initialization" refers to a default value that is set in a vehicle at the factory. Since such a menu has a tree structure, a SELECT button or a BACK button may allow the operator to move between upper and lower menus. After the 3D Level item is selected, the previous page is displayed to move to the upper menu.

The control unit 30 may also control a memory (not shown) to store the set 3D levels with respect to various information. In addition, the control unit 30 may control the cluster 40 to apply the 3D levels, which are set by the operator, with respect to various information collected by the communication unit 20 and display the results.

The cluster 40 may display various information with the corresponding 3D levels applied thereto under control of the control unit 30. In other words, the cluster 40 may give the 3D effect to various information to thereby increase recognition and intuition of the operator.

In one example, the cluster 40 may include a liquid crystal display (LCD), a 3D panel, and a camera. Here, the 3D panel may be provided with a barrier on the top layer of the LCD, and may present a left-side image to a left eye and present a right-side image to a right eye, thereby allowing the operator to perceive the 3D effect. In other words, by dividing a single image into odd-numbered pixels and even-numbered pixels, and presenting the odd-numbered pixels to the left eye while presenting the even-numbered pixels to the right eye, the operator may perceive the 3D effect. Here, the barrier may serve to block one-side image so as to present slightly different images to both eyes.

The cluster 40 having the above-described structure may experience a crosstalk problem when the eyes of the operator move leftward or rightward and a position of the image blocked by the barrier is changed. To solve this problem, the cluster 40 may adjust an angle of the barrier by tracking the eyes of the operator using a camera, thereby preventing the crosstalk. Here, the camera may be positioned in the center of the top of the cluster.

Figure 2:
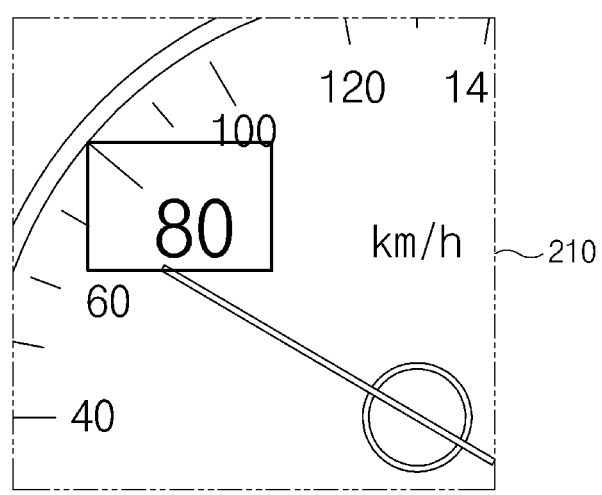
FIG. 2 illustrates a result of giving a three-dimensional (3D) level to a set speed of a smart cruise control (SCC) system or a speed limit of a road, according to embodiments of the present disclosure.

FIG. 2 illustrates a result of giving a 3D level to a set speed of an SCC system or a speed limit of a road, according to embodiments of the present disclosure.

As illustrated in FIG. 2, when a set speed of the SCC system or a speed limit of a road is 80 km/h, the control unit 30 may apply a 3D level to a box area 210 corresponding to 80 km/h of a speedometer (hereinafter referred to as a "first method"). Here, the 3D level may be a value which is set by the operator.

Such a first method may be used when the set speed of the SCC system or the speed limit of the road is displayed on the speedometer. In other words, since only even numbers such as 0, 20, 40, 60, . . . , and 220 are generally displayed on the speedometer of the cluster, it may be difficult to use the first method when the speed limit of the road is 70 km/h.

Figure 3:
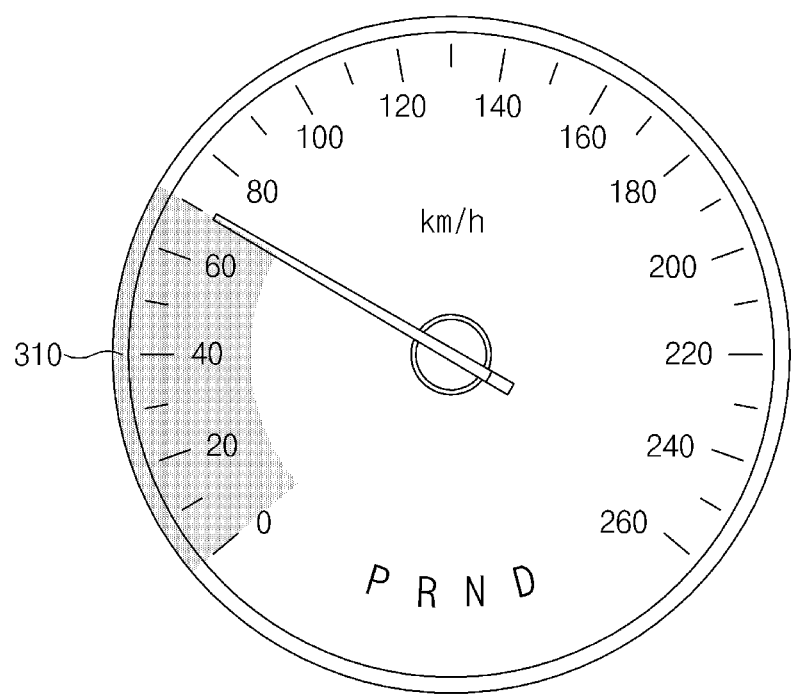
FIG. 3 illustrates a result of giving a 3D level to a set speed of an SCC system or a speed limit of a road, according to embodiments of the present disclosure.

In this case, a second method as illustrated in FIG. 3 may be used.

FIG. 3 illustrates another result of giving a 3D level to a set speed of an SCC system or a speed limit of a road, according to embodiments of the present disclosure.

As shown in FIG. 3, when a set speed of the SCC system or a speed limit of a road is 70 km/h, the control unit 30 may apply a 3D level to a gradation area 310 from 0 to 70 on the speedometer (the second method).

By using the first method or the second method, the recognition and intuition of the operator may be improved.

Figure 4:
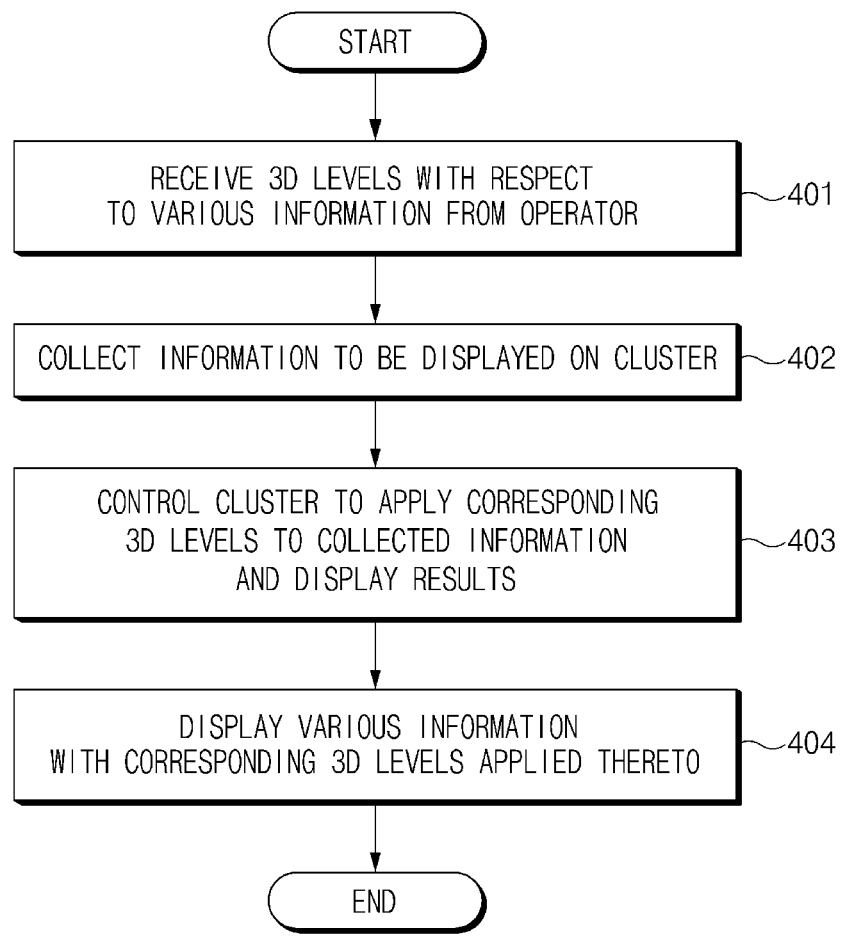
FIG. 4 illustrates a flowchart of a method for controlling a display of a cluster for a vehicle, according to embodiments of the present disclosure.

FIG. 4 illustrates a flowchart of a method for controlling a display of a cluster for a vehicle, according to embodiments of the present disclosure.

First, the setting unit 10 may receive settings indicating 3D levels, from the operator, with respect to various information in operation 401.

Next, the communication unit 20 may collect information to be displayed on the cluster in operation 402.

Thereafter, the control unit 30 may control the cluster to apply corresponding 3D levels to the information collected by the communication unit 20 and display the results in operation 403.

Then, the cluster 40 may display the information with the corresponding 3D levels applied thereto in operation 404.

As set forth above, the present inventive concept may increase the recognition and intuition of the operator by providing a 3D effect to various information displayed on the cluster of the vehicle.

In addition, the present inventive concept may provide a user customized service by allowing the operator (i.e., user) to set different 3D levels with respect to various information displayed on the cluster of the vehicle.

In addition, the present inventive concept may encourage safe driving by displaying the set speed of the SCC system and the speed limit of the road in a 3D manner.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a display of a cluster for a vehicle, the apparatus comprising:
   a setting unit receiving settings indicating three-dimensional (3D) levels that adjust a corresponding default 3D level with respect to various information to be displayed on the cluster from an operator;
   a communication unit collecting information to be displayed on the cluster;
   a control unit controlling the cluster to apply 3D levels corresponding to the information collected by the communication unit and to display the collected information with the corresponding 3D levels applied thereto; and
   the cluster displaying the collected information with the corresponding 3D levels applied thereto.

2. The apparatus according to claim 1, where the cluster applies different 3D levels to a first icon, a second icon, and a third icon, respectively.

3. The apparatus according to claim 2, wherein the control unit applies the 3D levels in an order of the first icon, the second icon, and the third icon.

4. The apparatus according to claim 2, wherein:
   the first icon includes at least one of a headlight, a front fog light, a turn signal light, and an ECO-mode,
   the second icon includes at least one of warning lights, a rear fog light, and an Electronic Stability Control (ESC) ON/OFF, and
   the third icon includes at least one of a coolant temperature and collision warnings.

5. The apparatus according to claim 2, wherein the control unit applies the corresponding 3D levels to the first icon which has a low degree of risk, the second icon which has an intermediate degree of risk, and the third icon which has a high degree of risk in a parking assist system (PAS), in an order of the first icon, the second icon, and the third icon.

6. The apparatus according to claim 1, wherein the control unit applies a 3D level corresponding to a set speed of a smart cruise control (SCC) system or a speed limit of a road.

7. The apparatus according to claim 6, wherein the control unit applies the 3D level corresponding to the set speed or the speed limit to an area of a speedometer of the vehicle.

8. The apparatus according to claim 7, wherein the control unit applies the corresponding 3D level to an area of the speedometer from 0to the set speed or an area of the speedometer from 0to the speed limit.

9. The apparatus according to claim 1, wherein the control unit controls a memory to store the 3D levels, which are set by the operator, with respect to various information.

10. The apparatus according to claim 1, wherein the communication unit provides an interface with an in-vehicle network system including at least one of a Controller Area Network (CAN), a Local Interconnect Network (LIN), FlexRay, and a Media Oriented System Transport (MOST).

11. A method for controlling a display of a cluster for a vehicle, the method comprising:
   receiving, at a setting unit, settings indicating three-dimensional (3D) levels that adjust a corresponding default 3D level with respect to various information to be displayed on the cluster from an operator;
   collecting, by a communication unit, information to be displayed on the cluster;
   controlling, by a control unit, the cluster to apply 3D levels corresponding to the information collected by the communication unit and to display the collected information with the corresponding 3D levels applied thereto; and
   displaying, by the cluster, the collected information with the corresponding 3D levels applied thereto.

12. The method according to claim 11, wherein the controlling of the cluster comprises applying, by the control unit, different 3D levels to a first icon, a second icon, and a third icon, respectively.

13. The method according to claim 12, wherein the controlling of the cluster comprises applying, by the control unit, the 3D levels in an order of the first icon, the second icon, and the third icon.

14. The method according to claim 12, wherein:
the first icon includes at least one of a headlight, a front fog light, a turn signal light, and an ECO-mode,
the second icon includes at least one of warning lights, a rear fog light, and an Electronic Stability Control (ESC) ON/OFF, and
the third icon includes at least one of a coolant temperature and collision warnings.

15. The method according to claim 12, wherein the controlling of the cluster comprises applying, by the control unit, the corresponding 3D levels to the first icon which has a low degree of risk, the second icon which has an intermediate degree of risk, and the third icon which has a high degree of risk in a parking assist system (PAS), in an order of the first icon, the second icon, and the third icon.

16. The method according to claim 11, wherein the controlling of the cluster comprises applying, by the control unit, a 3D level corresponding to a set speed of a smart cruise control (SCC) system or a speed limit of a road.

17. The method according to claim 16, wherein the controlling of the cluster comprises applying, by the control unit, the 3D level corresponding to the set speed or the speed limit to an area of a speedometer of the vehicle.

18. The method according to claim 17, wherein the controlling of the cluster comprises applying, by the control unit, the corresponding 3D level to an area of the speedometer from 0 to the set speed or an area of the speedometer from 0 to the speed limit.

19. The method according to claim 11, further comprising controlling, by the control unit, a memory to store the 3D levels, which are set by the operator, with respect to various information.

20. The method according to claim 11, wherein the communication unit provides an interface with an in-vehicle network system including at least one of a Controller Area Network (CAN), a Local Interconnect Network (LIN), FlexRay, and a Media Oriented System Transport (MOST).

* * * * *